United States Patent
Wong et al.

(10) Patent No.: US 7,321,258 B2
(45) Date of Patent: Jan. 22, 2008

(54) METHOD AND APPARATUS FOR CONTROLLING THE CHARGE OF A BOOTSTRAP CAPACITOR FOR NON-SYNCHRONOUS TYPE DC-DC CONVERTER

(75) Inventors: Shiah Siew Wong, Singapore (SG); Guolei Yu, Singapore (SG)

(73) Assignees: Matsushita Electric Industrial Co., Ltd., Osaka (JP); Panasonic Semiconductor Asia Pte., Ltd., Singapore (SG)

(*) Notice: Subject to any disclaimer, the term of this patent is extended or adjusted under 35 U.S.C. 154(b) by 231 days.

(21) Appl. No.: 11/193,666

(22) Filed: Jul. 29, 2005

(65) Prior Publication Data

US 2007/0024261 A1 Feb. 1, 2007

(51) Int. Cl.
*G05F 1/40* (2006.01)

(52) U.S. Cl. .................................... 327/589; 323/288

(58) Field of Classification Search ................ 327/589; 323/288, 284
See application file for complete search history.

(56) References Cited

U.S. PATENT DOCUMENTS

| 5,627,460 | A | 5/1997 | Bazinet |
| 7,026,801 | B2 * | 4/2006 | Fowler et al. ............ 323/271 |

* cited by examiner

*Primary Examiner*—Shawn Riley
(74) *Attorney, Agent, or Firm*—Harness, Dickey & Pierce, PLC

(57) ABSTRACT

A method of controlling the charge of the bootstrap capacitor during light load or no load conditions for a non-synchronous type of DC-DC converter consists of bootstrap capacitor voltage detector, light load detector and secondary switch controller. By turning on the secondary switch during the off-time of the power transistor when the bootstrap voltage is lower than the required value under light load condition, the bootstrap capacitor voltage will be able to charge back to the required value, yet minimizing the minimum current requirement for the DC-DC converter.

14 Claims, 5 Drawing Sheets

METHOD AND APPARATUS FOR
CONTROLLING THE CHARGE OF A
BOOTSTRAP CAPACITOR FOR
NON-SYNCHRONOUS TYPE DC-DC
CONVERTER

BACKGROUND OF THE INVENTION

The present invention relates to a non-synchronous dc-dc converter having a bootstrap capacitor and a control circuit and, more particularly, to a method for controlling the charge of a bootstrap capacitor for non-synchronous type DC-DC converter, and also to an apparatus for controlling the charge of a bootstrap capacitor for non-synchronous type DC-DC converter.

In an integrated step-down dc-dc converter system, the power device is usually NPN transistor in bipolar technology, NMOS in CMOS technology or N-type DMOS in BCD technology. Bootstrapping is often used to raise the driver voltage above the power rail in order to reduce the loss of the top power transistor. P-type transistor is not commonly used due to the relatively large area needed, which is about 2-3 times larger than the n-type counterpart.

For a non-synchronous DC-DC converter, in normal operation when load current is high enough, the bootstrap capacitor is charged by a voltage regulator through a diode when the switching node of the dc-dc converter goes to (−Vd) at the off-time of the power transistor, where Vd is the forward diode voltage drop. When the power transistor turns on, the switching node will go high. The stored voltage in the bootstrap capacitor will generate a voltage higher than the supply voltage. However, when the load current becomes light, which means that the inductor current becomes discontinuous during the off-time of the power transistor, the switching node of the dc-dc converter will only stay at (−Vd) for a very short time, and will be at the same voltage level as the output when the inductor current becomes 0. As a result, the voltage stored in the bootstrap capacitor will eventually become the difference between the voltage regulator output voltage subtracted by forward diode voltage drop and the output voltage. This may not be enough to fully turn on the driver for the power transistor.

To overcome this problem, one method is to connect a dummy load at the output of the dc-dc converter, so that there will be a certain amount of current flowing in the dc-dc converter even at light load or no load condition, which would keep the output transistor switching. The dummy load should be of certain value to make sure that the switching node could be able to stay at (−Vd) for sufficient long time for the bootstrap capacitor to charge up. One problem with this simple method is that the efficiency of the dc-dc converter is suffered because the current in the dummy load always flows to ground, even when the bootstrap capacitor voltage is high enough.

FIG. 1 is a block diagram showing a conventional DC-DC converter with the PWM controlled output stage using bootstrap and dummy load. Here the bipolar power transistor 3 is used for illustration only. The transistor could be a NMOS or N-type DMOS transistor. The bootstrap capacitor 7 is connected between the cathode of the diode, 9 and the switching node, LX. A voltage regulator, 17, is connected to the anode of the diode 9. The voltage regulator charges the bootstrap capacitor C1 when LX goes to (−VD1) at the power transistor off-time. The voltage across the bootstrap capacitor Cboot is (VREF). When the power transistor 3 is turned on, LX will go high. Hence the voltage at BS becomes (LX+VREF), which can be higher than the power rail voltage and provide this voltage to the driver block and fully saturate the power transistor 3.

One problem of the conventional bootstrap method is that the bootstrap capacitor may not be fully charged at light load or no load conditions. When the load current is light, the inductor current will eventually becomes discontinuous. As can be seen from FIG. 2, at light load, LX stays at −Vd for T1 and then becomes Vout when the inductor current becomes 0. That means the time to charge up the bootstrap capacitor becomes T1. For the rest of the off-time, the voltage across the bootstrap capacitor is (VREF−VD2−Vout). When the Vout is close to VREF, or even worse when Vout is higher than VREF, there may not be enough charging to the bootstrap capacitor.

The situation becomes worse when there is no load current drawing from the output of the DC-DC converter. LX will stay at the same voltage as Vout for an even longer time. So the bootstrap capacitor could not be charged to an enough high level to turn on the driver circuit when the load current becomes heavy after the light load condition and the switching of the power transistor is required.

To overcome this, one method is to add a dummy load, as shown in FIG. 1. The purpose of the dummy load is to maintain a certain amount of current flow in the inductor to keep the switching of the output node. But this method will reduce the efficiency of the DC-DC converter for all the conditions.

SUMMARY OF THE INVENTION

The purpose of this invention is to provide a method to control the charge in the bootstrap capacitor for step-down converter which operates under the light load or no load condition without the efficiency loss.

According to the present invention, a step-down dc-dc converter is incorporated with light load detector, bootstrap voltage detector, secondary switch and on-time control to maintain the voltage of the bootstrap capacitor under light load or no load.

For a PWM controlled step-down dc-dc converter, the output power transistor duty is determined comparing the amplified error voltage to a ramping signal, which could be a triangular wave or saw-tooth wave. When the amplified error voltage is higher than the ramping signal, the output power transistor will be turned on. During light load or no load, the duty cycle of the output power transistor will reduce, which implies that the amplified error voltage is near or lower than the bottom of the triangular wave or saw-tooth wave. By detecting the level of the amplified error voltage, a light load or no load condition can be detected.

The bootstrap voltage detector monitors the voltage across the bootstrap capacitor continuously. When the voltage across the bootstrap capacitor is lower than the threshold voltage, the bootstrap voltage detector will output a "bootstrap low" signal. The threshold voltage would be the minimum voltage that is needed to turn on the power transistor plus some margin.

When both the light load signal and "bootstrap low" signal are received, a secondary switch will turn on during the off-time of the power transistor. This will pull low the switching node voltage to nearly ground, which allows the bootstrap capacitor to charge up. During normal operation, when the bootstrap voltage can be maintained above the threshold voltage, the secondary switch is always off and consumes no current.

This switch is not the same as the commonly referred "synchronous rectifier" which turn on every cycle where the bootstrap capacitor is charged through the switch under normal operation. The size of the "synchronous rectifier" is comparable to the top power transistor because it needs to conduct high current. The size of the secondary switch in this invention only conducts the charging current of the bootstrap capacitor, which is usually a few tens of mA.

According to the present invention, a method for controlling the charge of a bootstrap capacitor for non-synchronous type DC-DC converter, having a power transistor, comprises:

comparing a voltage across the bootstrap capacitor with a predetermined threshold level; and turning on a secondary switch during off-time of the power transistor when the voltage across the bootstrap capacitor is lower than the predetermined threshold and when the light load condition is detected.

According to present invention, the method further comprising detecting the light load condition at the output.

According to present invention, the secondary switch is a secondary transistor.

According to present invention, the secondary switch includes a plurality of transistors.

According to present invention, the bootstrap capacitor is charged by a voltage regulator when the bootstrap capacitor voltage is higher than the predetermined level.

According to present invention, the bootstrap capacitor is charged by a voltage regulator when the load current is heavy.

According to present invention, the light load condition is detected by monitoring the drop of an error amplifier output.

According to present invention, on-time of the secondary switch is determined by comparing the ramping signal with a preset voltage.

According to present invention, an apparatus for controlling the charge of a bootstrap capacitor for non-synchronous type DC-DC converter, having a power transistor, comprises:

a comparator operative to compare a voltage across the bootstrap capacitor with a predetermined threshold level; and a secondary switch operative to be turned on during off-time of the power transistor when the voltage across the bootstrap capacitor is lower than the predetermined threshold and when the light load condition is detected.

According to present invention, the apparatus further comprises a light load detector operative to detect the light load condition at the output.

According to present invention, the secondary switch is a secondary transistor.

According to present invention, the secondary switch includes a plurality of transistors.

According to present invention, the bootstrap capacitor is charged by a voltage regulator when the bootstrap capacitor voltage is higher than the predetermined level.

According to present invention, the bootstrap capacitor is charged by a voltage regulator when the load current is heavy.

According to present invention, the light load detector detects the light load condition by monitoring the drop of an error amplifier output.

According to present invention, on-time of the secondary switch is determined by comparing the ramping signal with a preset voltage.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

The following description explains the best mode embodiment of the present invention.

First Embodiment

Figure 1:
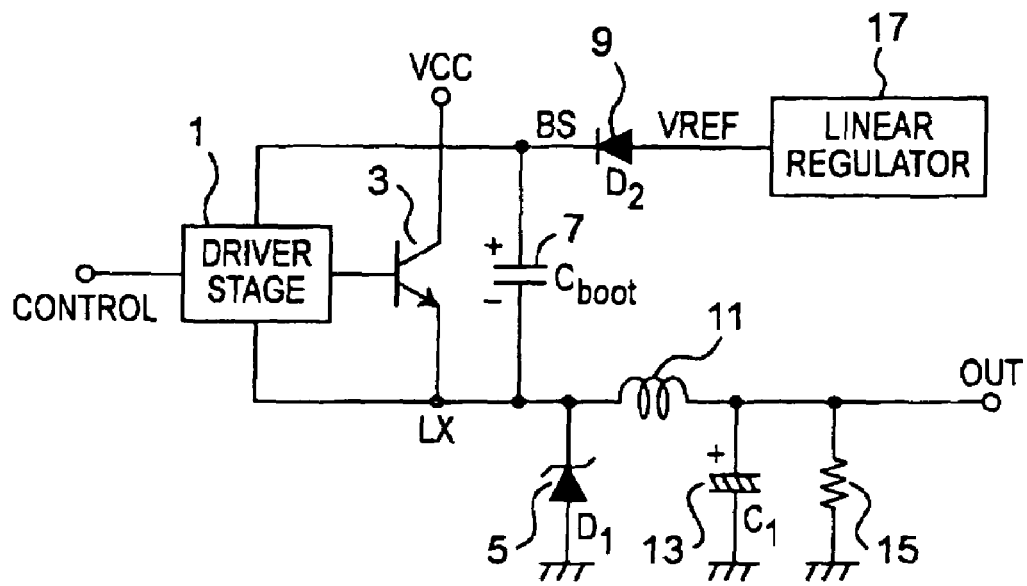
FIG. 1 is a block diagram showing the output stage of a PWM with bootstrap and dummy load according to the prior art.
Figure 2:
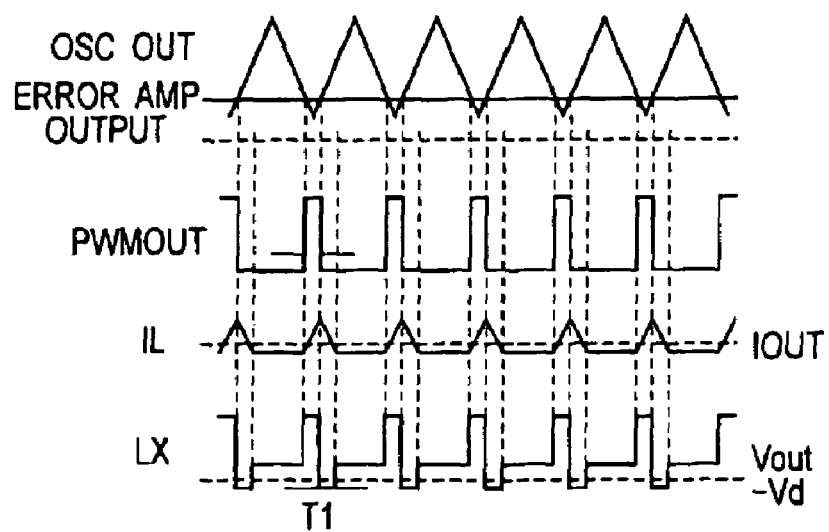
FIG. 2 is the output waveforms during light load of FIG. 1.
Figure 3:
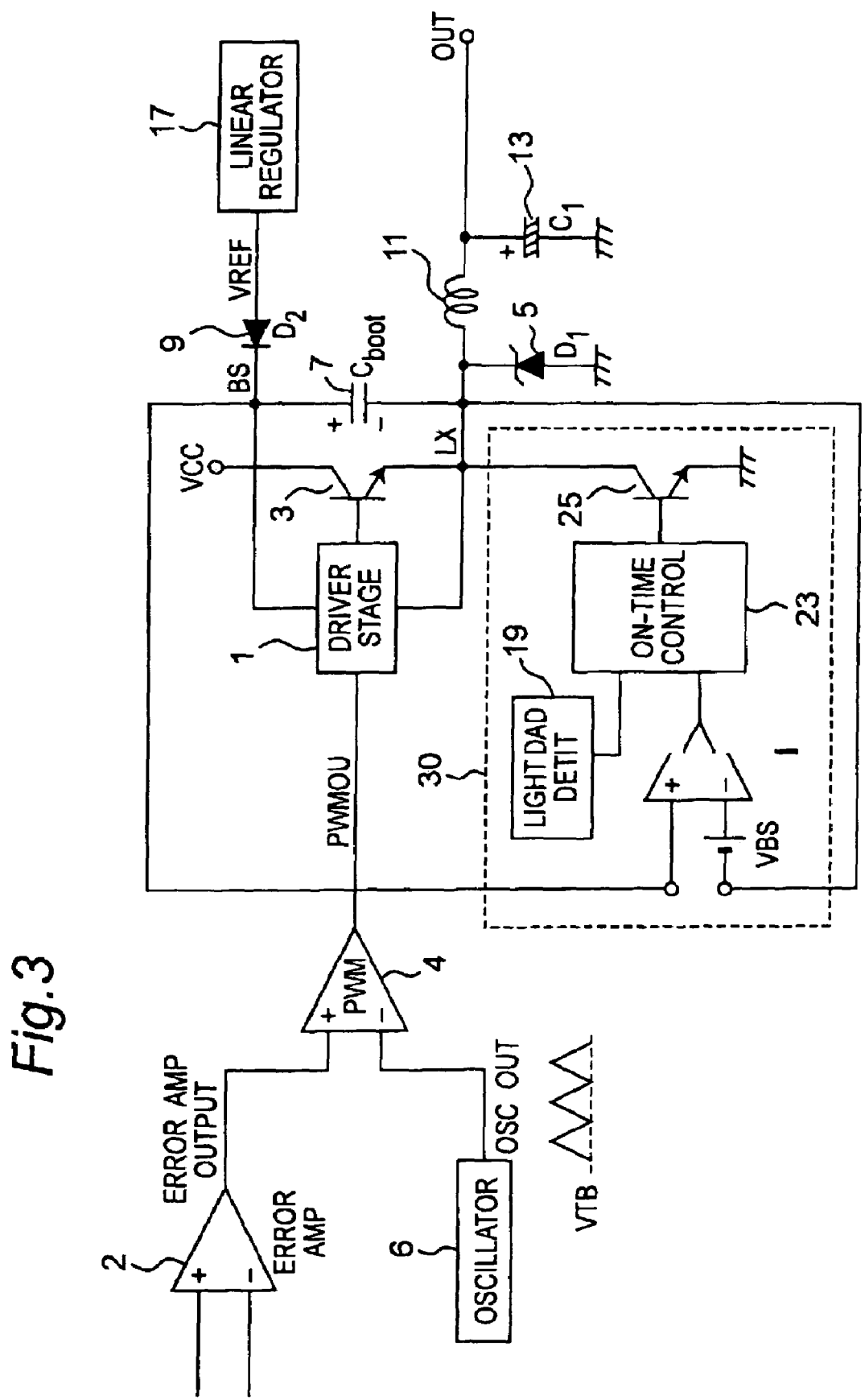
FIG. 3 is a block diagram of a bootstrap charge control network according to the first embodiment.

Referring to FIG. 3, a first embodiment of a non-synchronous DC-DC converter according to the present invention is shown.

The DC-DC converter has an error amplifier 2, an oscillator 6, a pulse width modulation (PWM) circuit 4, a driver stage 1, a power transistor 3, a linear regulator 17, a diode 9, a bootstrap capacitor 7, a diode 5, an inductor 11, a capacitor 13, and a control circuit 30. The load control circuit 30 has a BS (bootstrap) voltage detector 21, a light load detector 19, an on-time control 23 and a secondary switch 25 formed by a transistor 25. The secondary switch 25 can be formed by a plurality of transistors.

Here a bipolar power transistor 3 is used, but can be any other type, such as a NMOS transistor or an N-type DMOS transistor. The bootstrap capacitor 7 is connected between the cathode of the diode 9 and a switching node LX. Here, LX is also used as a voltage level at the node LX. The voltage regulator 17 is connected to the anode of the diode 9. The voltage regulator 17 charges the bootstrap capacitor C1 when the voltage LX goes to (−VD1) at the power transistor off-time. The voltage across the bootstrap capacitor 7 is (VREF). When the power transistor 3 is turned on, the voltage LX goes high. Hence the voltage at BS becomes (LX+VREF), which can be higher than VCC. This voltage is applied to the driver stage 1 to fully saturate the power transistor 3.

The circuit has no maximum duty limit. In the circuit, a bootstrap capacitor voltage, that is a voltage across capacitor 7, can drop below a threshold voltage under two conditions. One is the light load condition; the other is when the duty cycle of the output is higher than a predetermined duty cycle. The later is due to the off-time of the power transistor being shorter than a predetermined off-time which is necessary for the bootstrap capacitor to charge up. This invention is targeted to maintain the bootstrap capacitor for light load. Hence, a light load detector is necessary for this embodiment.

The light load detector 19 produces a light-load signal when the output current becomes lower than a predetermined threshold level. The light load detector 19 detects the load by detecting the reduction in duty cycle or some other methods. The BS voltage detector 21 detects the voltage across the bootstrap capacitor 7, and compares the detected voltage with a predetermined voltage VBS. The voltage VBS is the preset threshold voltage which is higher than the minimum required voltage for the bootstrap to work. When the voltage across the bootstrap capacitor becomes less than the voltage VBS, the BS voltage detector 21 produces a high level signal. When the light load is detected, and the BS voltage detector 21 produces high level signals, the on-time control 23 produces a high level signal to turn on the secondary transistor 25, during the off-time of the main power transistor 3. The on-time of the secondary transistor 25 is determined by the on-time control 23. When the secondary transistor 25 is turned on, LX voltage will be pulled near to the ground voltage. Hence, the bootstrap capacitor 7 is charged up to "VREF−VD".

Figure 4A:
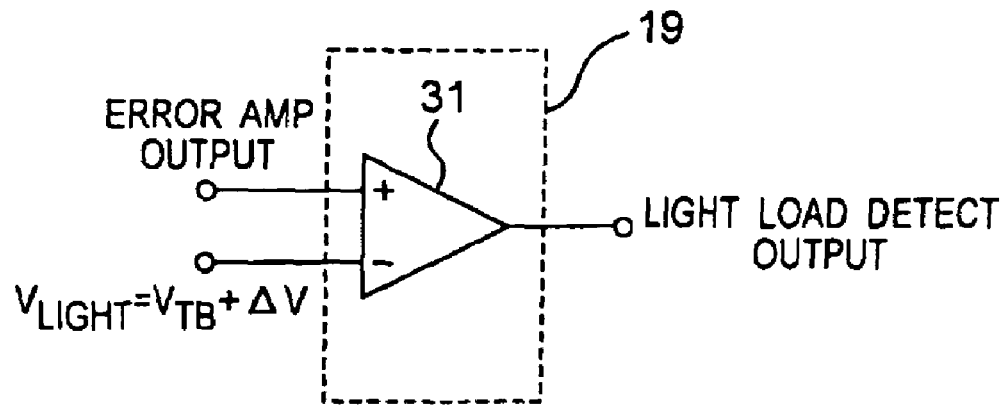
FIG. 4A is a circuit diagram of a light load detector shown in FIG. 3.

FIG. 4A is a circuit diagram showing a preferred example of the light load detector 19. The light load detector 19 includes a comparator 31 which detects the reduction of the output duty cycle. The comparator 31 compares the output of the error amplifier 2 with a predetermined voltage Vlight (=VTB+ΔV).

Figure 4B:
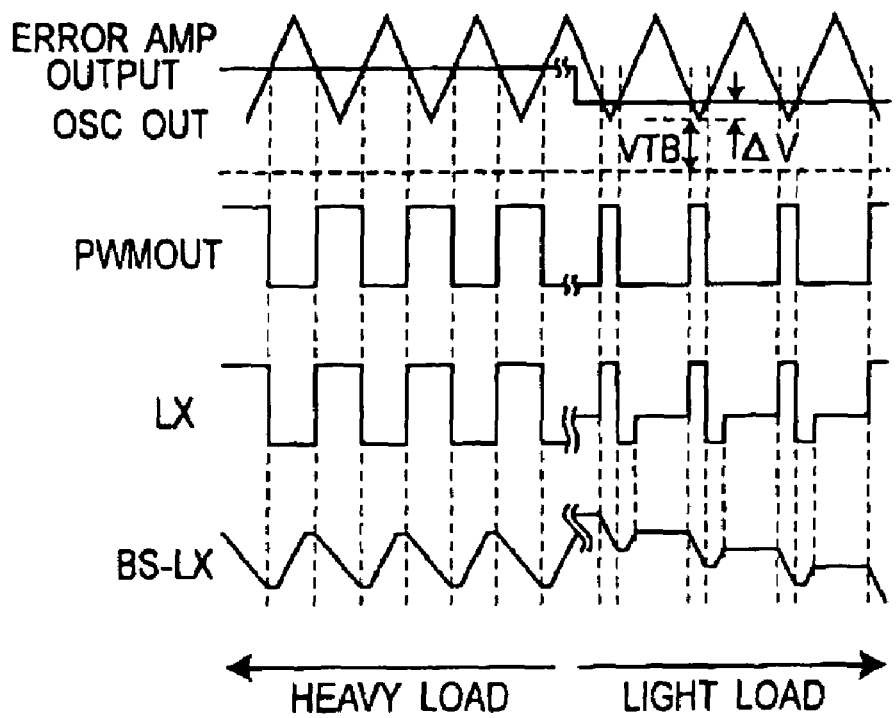
FIG. 4B shows waveforms to explain the operation of the light load detector.

As shown in FIG. 3, in a PWM DC-DC converter, the duty cycle is determined by a comparator 4 which compares the output of the error amplifier 2 with a triangular signal produced from oscillator 6. As shown in FIG. 4B, when the error amplifier output is higher than the triangular oscillator output, the PWM output is high and the power transistor 3 is turned on. At light load, shown in the right hand half side of FIG. 4B, the duty cycle is reduced. As a result, error amplifier output will move downward to the bottom of the ramping signal waveform, which could be either a triangular waveform or saw-tooth waveform. The threshold of the light load detector 19 should be set higher than the bottom of the saw-tooth wave by a voltage ΔV, as shown in FIG. 4B. The voltage ΔV is determined such that for error amplifier output at this level, the DC-DC output duty cycle will be enough for the bootstrap capacitor 7 to charge up during the power transistor off-time. The comparator 31 of the light load detector 19 compares the output of the error amplifier with the other input of a reference signal generator producing a fixed voltage of the magnitude of the sum of the bottom of the triangular oscillator output VTB and the voltage ΔV. The light load detector 19, together with the BS voltage detector 21, determines a light load condition.

Figure 5A:
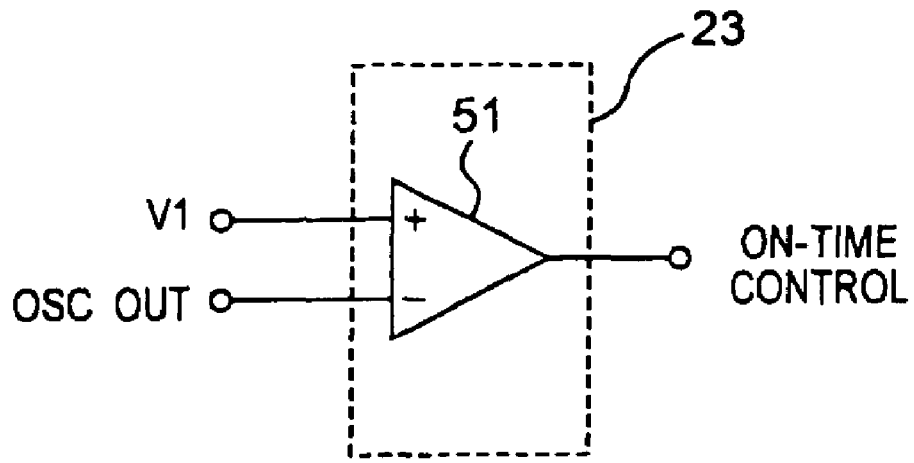
FIG. 5A is a circuit diagram of an on-time control shown in FIG. 3.
Figure 5B:
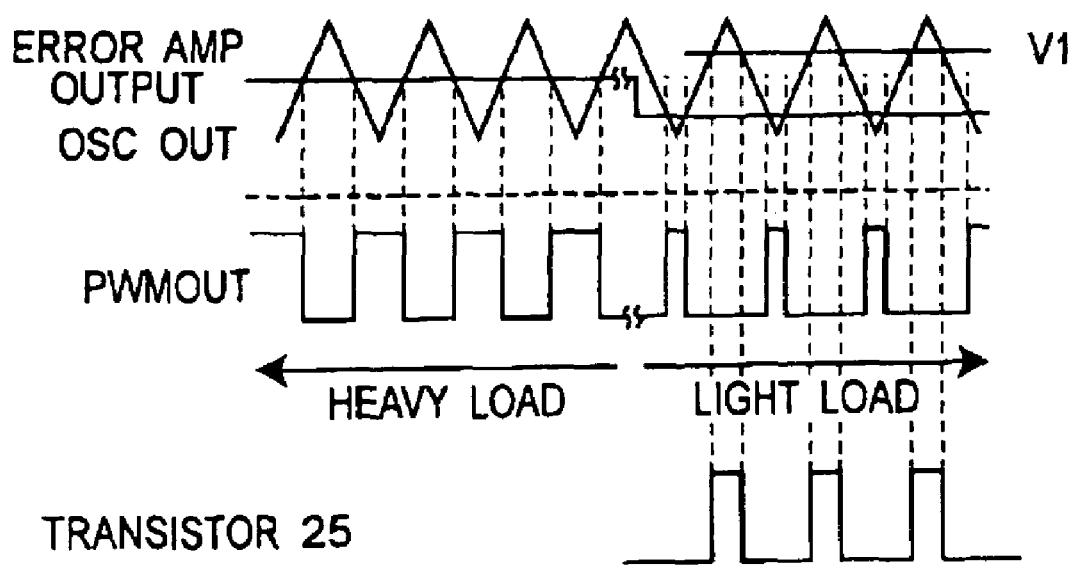
FIG. 5B shows waveforms to explain the operation of the on-time control circuit.

FIG. 5A is a circuit diagram showing a preferred example of the on-time control 23. The on-time control 23 includes a comparator 51. One input of the comparator 51 is applied with a predetermined voltage V1 and the other input of the same is applied with the output of the oscillator 6. The on-time of the secondary transistor 25 is set during power transistor off-time. As shown in FIG. 5B, the voltage V1 is a voltage that is lower than the peak value of the ramping signal, i.e., the triangle signal, and higher than the error amplifier output voltage under light load condition. When the ramping signal is higher than V1, the output of the comparator 51 is high, which allows the secondary transistor 25 to turn on. The secondary transistor 25 is only allowed to turn on when the ramping signal is higher than V1.

Second Embodiment

Figure 6:
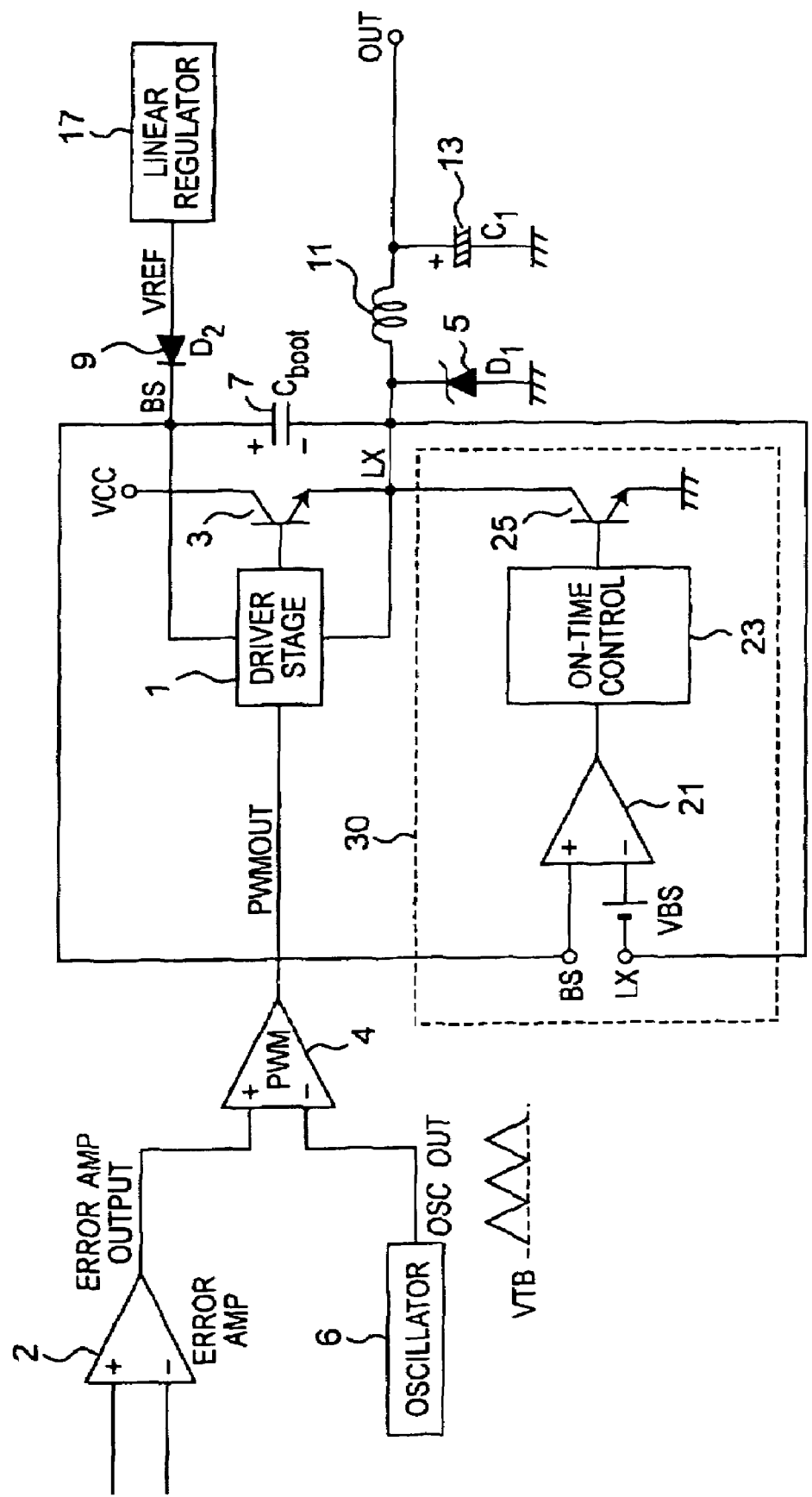
FIG. 6 is a block diagram of a bootstrap charge control network according to the second embodiment.
Figure 3:
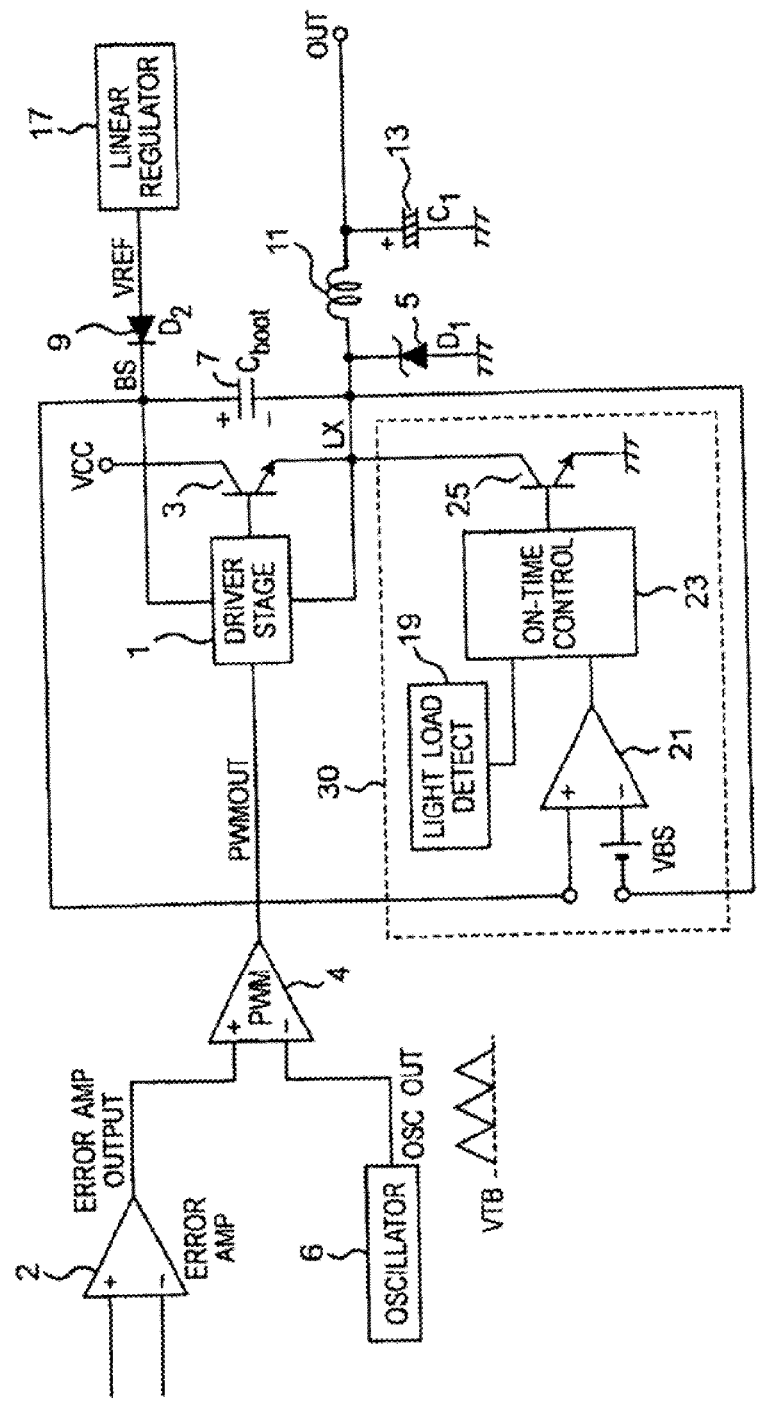

Referring to FIG. 6, a second embodiment of a non-synchronous DC-DC converter with maximum duty limit according to the present invention is shown.

The second embodiment shown in FIG. 6 differs from the first embodiment of FIG. 3 in that the second embodiment does not have a light load detector 19. The elements in FIG. 6 are numbered with the same reference number as that used in FIG. 3 and have the same function as that of FIG. 3. The on-time of the secondary transistor 25 is determined by the duration when the maximum voltage is higher than the ramping signal, or by using the same method as described in FIG. 5.

Having described the above embodiment of the invention, various alternations, modifications or improvement could be made by those skilled in the art. Such alternations, modifications or improvement are intended to be within the spirit and scope of this invention. The above description is by ways of example only, and is not intended as limiting. The invention is only limited as defined in the following claims.

What is claimed is:

1. A method for controlling the charge of a bootstrap capacitor for non-synchronous type DC-DC converter, having a power transistor, the method comprising:
   comparing a voltage across the bootstrap capacitor with a predetermined threshold level; and
   turning on a secondary switch during off-time of said power transistor when the voltage across the bootstrap capacitor is lower than the predetermined threshold and when the light load condition is detected.

2. The method according to claim 1, further comprising detecting the light load condition at the output.

3. The method according to claim 1, wherein said secondary switch comprises a secondary transistor.

4. The method according to claim 1, wherein said bootstrap capacitor is charged by a voltage regulator when the bootstrap capacitor voltage is higher than the predetermined level.

5. The method according to claim 2, wherein said bootstrap capacitor is charged by a voltage regulator when the load current is heavy.

6. The method according to claim 2, wherein the light load condition is detected by monitoring the drop of an error amplifier output.

7. The method according to claim 1, wherein on-time of said secondary switch is determined by comparing the ramping signal with a preset voltage.

8. An apparatus for controlling the charge of a bootstrap capacitor for non-synchronous type DC-DC converter, having a power transistor, the apparatus comprising:
   a comparator operative to compare a voltage across the bootstrap capacitor with a predetermined threshold level; and
   a secondary switch operative to be turned on during off-time of said power transistor when the voltage across the bootstrap capacitor is lower than the predetermined threshold and when the light load condition is detected.

9. The apparatus according to claim 8, further comprising a light load detector operative to detect the light load condition at the output.

10. The apparatus according to claim 8, wherein said secondary switch comprises a secondary transistor.

11. The apparatus according to claim 8, wherein said bootstrap capacitor is charged by a voltage regulator when the bootstrap capacitor voltage is higher than the predetermined level.

12. The apparatus according to claim 9, wherein said bootstrap capacitor is charged by a voltage regulator when the load current is heavy.

13. The apparatus according to claim 9, wherein said light load detector detects the light load condition by monitoring the drop of an error amplifier output.

14. The apparatus according to claim 8, wherein on-time of the secondary switch is determined by comparing the ramping signal with a preset voltage.

* * * * *

UNITED STATES PATENT AND TRADEMARK OFFICE
CERTIFICATE OF CORRECTION

PATENT NO.        : 7,321,258 B2                                             Page 1 of 2
APPLICATION NO.   : 11/193666
DATED             : January 22, 2008
INVENTOR(S)       : Wong et al.

It is certified that error appears in the above-identified patent and that said Letters Patent is hereby corrected as shown below:

Delete Sheet 2 of 5 and

Replace FIG. 3 (page 2 of 5) with the attached replacement sheet

Signed and Sealed this

Twenty-seventh Day of May, 2008

JON W. DUDAS
*Director of the United States Patent and Trademark Office*